United States Patent
Kawasaki et al.

(10) Patent No.: US 12,204,141 B2
(45) Date of Patent: Jan. 21, 2025

(54) OPTICAL FIBER BUNDLE STRUCTURE, OPTICAL CONNECTOR, OPTICAL FIBER CONNECTION STRUCTURE, AND METHOD OF MANUFACTURING OPTICAL FIBER BUNDLE STRUCTURE

(71) Applicant: FURUKAWA ELECTRIC CO., LTD., Tokyo (JP)

(72) Inventors: Kohei Kawasaki, Tokyo (JP); Ryuichi Sugizaki, Tokyo (JP); Masayoshi Tsukamoto, Tokyo (JP); Masanori Takahashi, Tokyo (JP); Shigehiro Takasaka, Tokyo (JP); Koichi Maeda, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 18/410,605

(22) Filed: Jan. 11, 2024

(65) Prior Publication Data

US 2024/0142697 A1    May 2, 2024

Related U.S. Application Data

(60) Division of application No. 17/479,343, filed on Sep. 20, 2021, now Pat. No. 11,940,649, which is a
(Continued)

(30) Foreign Application Priority Data

Mar. 27, 2019  (JP) ................................. 2019-060379

(51) Int. Cl.
*G02B 6/04* (2006.01)
*C03C 25/106* (2018.01)
(Continued)

(52) U.S. Cl.
CPC .............. *G02B 6/04* (2013.01); *C03C 25/106* (2013.01); *C03C 25/26* (2013.01); *G02B 6/403* (2013.01)

(58) Field of Classification Search
CPC ...................................... G02B 6/403
See application file for complete search history.

(56) References Cited

U.S. PATENT DOCUMENTS 4,735,479 A * 4/1988 Nicholls .............. G02B 6/3672
 385/83
5,748,820 A 5/1998 Le Marer et al.
(Continued)

FOREIGN PATENT DOCUMENTS

CN    103443679 A    12/2013
JP    6-148465 A    5/1994
(Continued)

OTHER PUBLICATIONS

International Search Report issued Jun. 16, 2020 in PCT/JP2020/013354, filed on Mar. 25, 2020, 2 pages.
(Continued)

*Primary Examiner* — Chris H Chu
(74) *Attorney, Agent, or Firm* — Oblon, McClelland, Maier & Neustadt, L.L.P.

(57) ABSTRACT

An optical fiber bundle structure includes: plural optical fiber core wires; a crossing preventing member; and a grasping member. Further, the crossing preventing member has slits and the widths of the slits positioned at the respective sides are each equal to or larger than a difference between: a length of one side of a polygon circumscribing the plural optical fiber core wires at a hindmost end portion of the slits at the trailing end; and a length of one side of a polygon circumscribing the plural optical fiber core wires at the leading end.

2 Claims, 17 Drawing Sheets

Related U.S. Application Data continuation of application No. PCT/JP2020/013354, filed on Mar. 25, 2020.

(51) Int. Cl.
*C03C 25/26* (2018.01)
*G02B 6/40* (2006.01)

(56) References Cited

U.S. PATENT DOCUMENTS

| | | | |
|---|---|---|---|
| 9,158,064 B2* | 10/2015 | Saito | G02B 6/2551 |
| 9,658,410 B2* | 5/2017 | Saito | G02B 6/3885 |
| 2002/0064350 A1* | 5/2002 | Pawluczyk | G02B 6/403 |
| | | | 385/54 |
| 2008/0069502 A1* | 3/2008 | Ma | G02B 6/403 |
| | | | 65/406 |
| 2014/0010500 A1 | 1/2014 | Saito et al. | |
| 2020/0103603 A1* | 4/2020 | Halderman | G02B 6/403 |

FOREIGN PATENT DOCUMENTS

| | | |
|---|---|---|
| JP | 6-201923 A | 7/1994 |
| JP | 2012-83579 A | 4/2012 |
| JP | 2017-9859 A | 1/2017 |
| JP | 2017-167299 A | 9/2017 |
| JP | 2017-181791 A | 10/2017 |

OTHER PUBLICATIONS

Combined Chinese Office Action and Search Report issued Dec. 19, 2022 in Chinese Patent Application No. 202080020929.4 (with unedited computer-generated English Translation of Office Action only), 15 pages.

Japanese Office Action dated Sep. 26, 2023 in Japanese Patent Application No. 2021-509508 w/English machine translation, 8 pages.

\* cited by examiner

OPTICAL FIBER BUNDLE STRUCTURE, OPTICAL CONNECTOR, OPTICAL FIBER CONNECTION STRUCTURE, AND METHOD OF MANUFACTURING OPTICAL FIBER BUNDLE STRUCTURE

CROSS-REFERENCE TO RELATED APPLICATION(S)

This application is a divisional of U.S. patent application Ser. No. 17/479,343 filed on Sep. 20, 2021, which is a continuation of International Application No. PCT/JP2020/013354, filed on Mar. 25, 2020 which claims the benefit of priority of the prior Japanese Patent Application No. 2019-060379, filed on Mar. 27, 2019, the entire contents of which are incorporated herein by reference.

BACKGROUND

The present disclosure relates to an optical fiber bundle structure, an optical connector, an optical fiber connection structure, and a method of manufacturing the optical fiber bundle structure.

Multi-core fibers that are optical fibers each having plural core portions have been known. An optical fiber bundle structure has been proposed (for example, see Japanese Laid-open Patent Publication No. 2017-181791) for connecting a multi-core fiber and single-core fibers to each other, the optical fiber bundle structure having cores of the single-core fibers arranged at positions corresponding to cores of the multi-core fiber.

An optical fiber bundle structure has been disclosed in Japanese Laid-open Patent Publication No. 2017-181791, the optical fiber bundle structure including: plural optical fiber core wires each having, in order from a leading end thereof, a small diameter portion, a tapered portion that increases in diameter toward a trailing end thereof, a large diameter portion, and a resin coated portion coated with resin; and a capillary that holds these optical fiber core wires. In this optical fiber bundle structure, the small diameter portions and resin coated portions of the optical fiber core wires come into contact with the inner surface of the capillary and the optical fiber core wires are thereby set in position.

SUMMARY

There is a need for providing an optical fiber bundle structure, an optical connector, an optical fiber connection structure, and a method of manufacturing the optical fiber bundle structure, with a small loss.

According to an embodiment, an optical fiber bundle structure includes: plural optical fiber core wires; a crossing preventing member having the plural optical fiber core wires inserted through the crossing preventing member along a longitudinal direction; and a grasping member that applies a grasping force to the crossing preventing member. Further, the plural optical fiber core wires have, in order from a leading end of the plural optical fiber core wires, a glass fiber portion, and a resin coated portion having resin coated on glass fibers, the glass fiber portion has, in order from a leading end of the glass fiber portion, a small diameter portion, a tapered portion, and a large diameter portion, the crossing preventing member has slits formed therein, the slits each having a width with a width's center at a point equally dividing one of sides of a polygon circumscribing the plural optical fiber core wires, by a number of the optical fiber core wires that are in contact with that side in a cross section of the crossing preventing member, the cross section being orthogonal to the longitudinal direction, the slits extending from a leading end of the crossing preventing member to a midway point closer to a trailing end of the crossing preventing member, and the widths of the slits positioned at the respective sides are each equal to or larger than a difference between: a length of one side of a polygon circumscribing the plural optical fiber core wires at a hindmost end portion of the slits at the trailing end; and a length of one side of a polygon circumscribing the plural optical fiber core wires at the leading end.

According to an embodiment, an optical fiber bundle structure includes: plural optical fiber core wires; a crossing preventing member having the plural optical fiber core wires inserted through the crossing preventing member along a longitudinal direction; and a grasping member that applies a grasping force to the crossing preventing member. Further, the plural optical fiber core wires have, in order from a leading end of the plural optical fiber core wires, a glass fiber portion, and a resin coated portion having resin coated on glass fibers, the glass fiber portion has, in order from a leading end of the glass fiber portion, a small diameter portion, a tapered portion, and a large diameter portion, the crossing preventing member has slits formed therein, the slits each having a width with a width's center at a point equally dividing one of sides of an approximate polygon circumscribing the plural optical fiber core wires, by a number of the optical fiber core wires that are in contact with that side in a cross section of the crossing preventing member, the cross section being orthogonal to the longitudinal direction, the slits extending from a leading end of the crossing preventing member to a midway point closer to a trailing end of the crossing preventing member, each vertex of the approximate polygon circumscribing the plural optical fiber core wires has a curved shape, and the sum of the widths of the slits positioned at the respective sides is equal to or larger than a difference between: a length of a shortest perimeter surrounding the plural optical fiber core wires at a hindmost end portion of the slits at the trailing end; and a length of a shortest perimeter surrounding the plural optical fiber core wires at the leading end.

According to an embodiment, a method of manufacturing an optical fiber bundle structure, includes: a placing step of placing a crossing preventing member into a guide member that is annular so that protruding portions protruding radially inward in the guide member are fitted into slits formed in the crossing preventing member, the slits each having, in a cross section orthogonal to a longitudinal direction of the crossing preventing member, a width with a width's center at a point equally dividing one of sides of a polygon circumscribing plural optical fiber core wires, by a number of the optical fiber core wires that are in contact with that side, the crossing preventing member having the plural optical fiber core wires inserted through the crossing preventing member along the longitudinal direction, the plural optical fiber core wires having, in order from a leading end of the plural optical fiber core wires, a glass fiber portion and a resin coated portion having resin that covers glass fibers, the slits extending from a leading end of the crossing preventing member to a midway point closer to a trailing end of the crossing preventing member, the widths of the slits positioned at the respective sides each being equal to or larger than a difference between: a length of one side of a polygon circumscribing the plural optical fiber core wires at a hindmost end portion of the slits at the trailing end; and a length of one side of a polygon circumscribing the plural optical fiber core wires at the leading end; an inserting step of inserting the plural optical fiber core wires that have been lined up in a predetermined arrangement, into the crossing preventing member from the leading end to trailing end of the crossing preventing member; a pulling step of pulling the optical fiber core wires toward the trailing end while applying a grasping force to the crossing preventing member, until a small diameter portion of the glass fiber portion is positioned inside the crossing preventing member, the glass fiber portion having, in order from a leading end of the glass fiber portion: the small diameter portion; a tapered portion; and a large diameter portion; a removing step of removing the guide member from the crossing preventing member; and a ferrule placing step of placing the crossing preventing member into a hole portion of a ferrule while applying a grasping force to the crossing preventing member.

DETAILED DESCRIPTION

In the related art, the optical fiber core wires in the optical fiber bundle structure disclosed in Japanese Laid-open Patent Publication No. 2017-181791 are not set in position at the tapered portions and large diameter portions of the optical fiber core wires. As a result, even if the optical fiber core wires have been set in position at the small diameter portions and resin coated portions of the optical fiber core wires in this optical fiber bundle structure, the optical fiber core wires may cross each other at the tapered portions and the large diameter portions. This crossing between the optical fiber core wires unfavorably generates bending loss.

Modes for implementing the present disclosure (hereinafter, embodiments) will be described below by reference to the drawings. The present disclosure is not limited by the embodiments described below. The same reference sign is assigned to the same portions throughout the drawings. The drawings are schematic, and relations among dimensions of elements and ratios among the elements, for example, may be different from the actual ones. A portion having different dimensional relations and ratios among the drawings may also be included.

First Embodiment

Optical Fiber Bundle Structure

Figure 1:
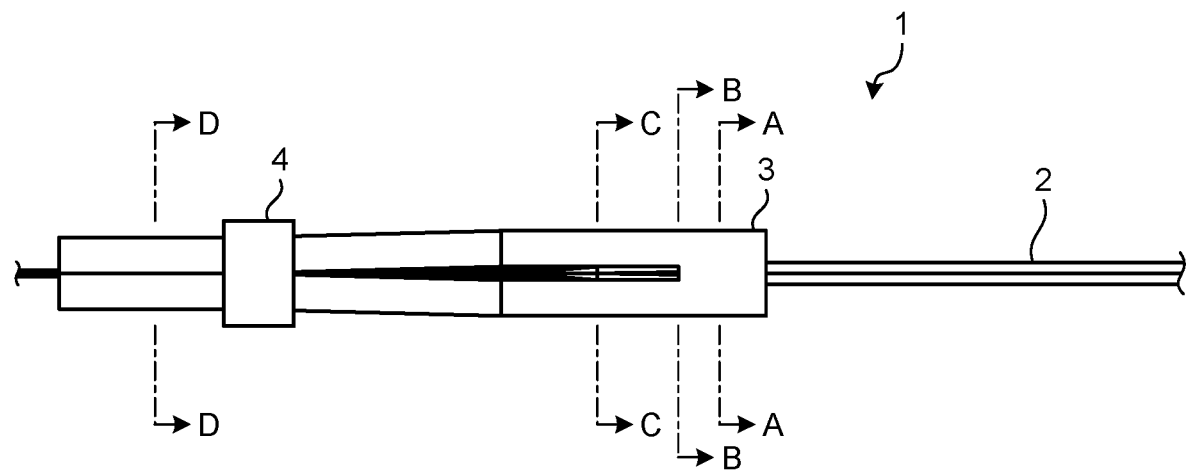
FIG. 1 is a schematic diagram illustrating a configuration of an optical fiber bundle structure according to a first embodiment of the present disclosure.
Figure 2:
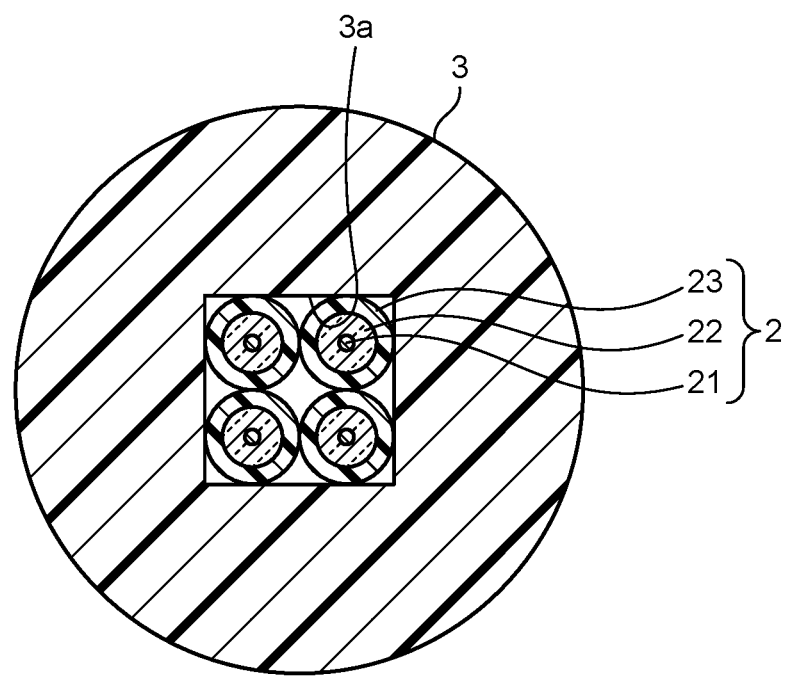
FIG. 2 is a sectional view corresponding to an A-A line in FIG. 1.

An optical fiber bundle structure will be described first. FIG. 1 is a schematic diagram illustrating a configuration of an optical fiber bundle structure according to a first embodiment of the present disclosure. FIG. 2 is a sectional view corresponding to an A-A line in FIG. 1. The left end along the plane of paper of FIG. 1 will hereinafter be referred to as a leading end and the right end as a trailing end.

An optical fiber bundle structure 1 includes: plural optical fiber core wires 2 having the same diameter; a crossing preventing member 3 through which the plural optical fiber core wires 2 have been inserted along a longitudinal direction thereof; and a grasping member 4 that applies a grasping force to the crossing preventing member 3.

The optical fiber core wires 2 each have a core 21, a cladding 22 formed around the core 21, and a coating 23 formed of resin. The optical fiber core wires 2 are held in a predetermined arrangement. In an example illustrated in FIG. 2, the cores 21 of four optical fiber core wires 2 are arranged to be positioned at vertices of a square (a regular polygon). That is, adjacent ones of the optical fiber core wires 2 are arranged at approximately the same distance from each other. Such an arrangement in which the centers of the cores 21 forms a square when joined to each other will be referred to as a square arrangement.

The cores 21 are formed of, for example, silica-based glass doped with, for example, germanium and having a high refractive index. The refractive indices of the plural cores 21 may be the same but may be different from one another. The claddings 22 are formed of a material having a refractive index lower than that of the cores 21, and are formed of, for example, pure silica glass not doped with a refractive index adjusting dopant.

Figure 3:
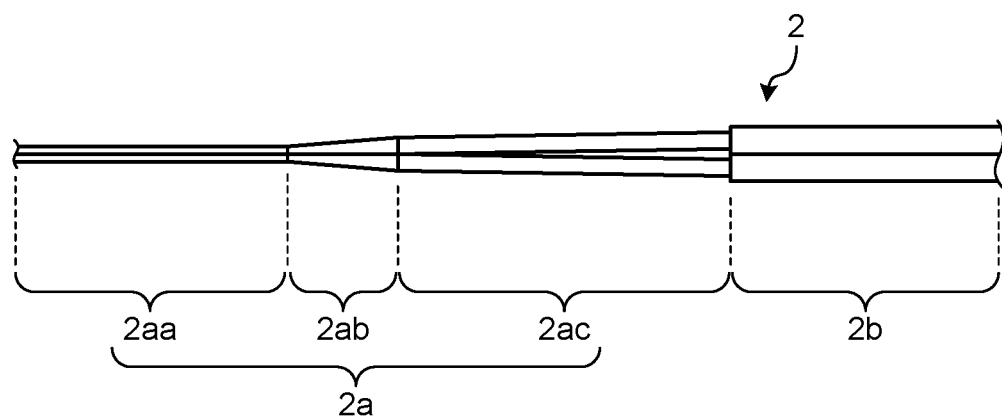
FIG. 3 is a schematic diagram illustrating a configuration of optical fiber core wires illustrated in FIG. 1.

FIG. 3 is a schematic diagram illustrating a configuration of the optical fiber core wires illustrated in FIG. 1. The optical fiber core wires 2 each have, in order from the leading end, a glass fiber portion 2a, and a resin coated portion 2b having resin that covers a glass fiber. Furthermore, the glass fiber portions 2a each have, in order from the leading end, a small diameter portion 2aa, a tapered portion 2ab, and a large diameter portion 2ac.

The small diameter portions 2aa each have a cladding diameter (a diameter of the cladding 22) of 40 μm, but the small diameter portions 2aa may each have a cladding diameter of 30 μm to 80 μm and a core diameter (a diameter of the core 21) of 6 μm to 12 μm. The core diameters in the glass fiber portions 2a (the small diameter portions 2aa, the tapered portions 2ab, and the large diameter portions 2ac) and the resin coated portions 2b are the same.

The tapered portions 2ab each decrease in cladding diameter toward the leading end. The tapered portions 2ab each have a cladding diameter of, for example, 40 μm at the leading end and a cladding diameter of, for example, 80 μm at the trailing end.

The small diameter portions 2aa and the tapered portions 2ab are formed by removing the coatings 23 for the resin coated portions 2b to expose the glass fibers inside and subjecting predetermined lengths of the exposed glass fibers at the leading end to chemical etching, for example. That is, the small diameter portions 2aa and the tapered portions 2ab have diameters smaller than those of the large diameter portions 2ac. The large diameter portions 2ac each have a cladding diameter of, for example, 80 μm.

The resin coated portions 2b each have a cladding diameter of, for example, 80 μm, and have the coatings 23 covering around the resin coated portions 2b. The resin coated portions 2b each have a coating diameter (a diameter of the coating 23) of, for example, 125 μm.

Figure 4:
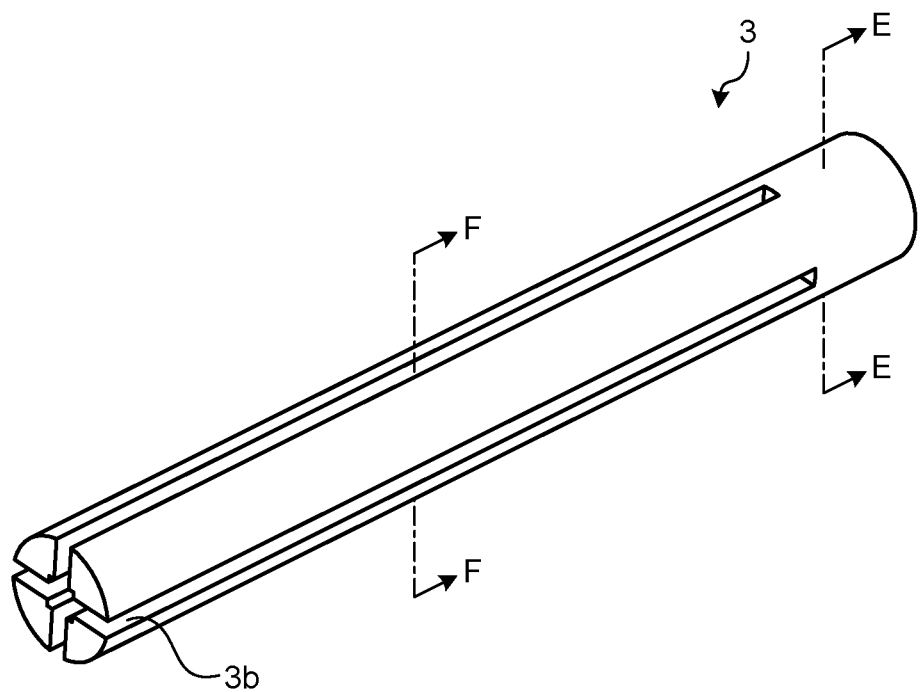
FIG. 4 is a schematic diagram illustrating a configuration of a crossing preventing member illustrated in FIG. 1.
Figure 5:
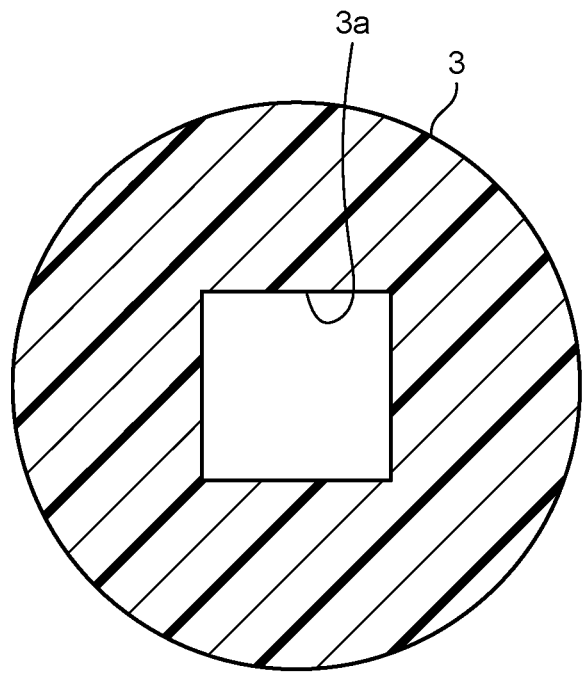
FIG. 5 is a sectional view corresponding to an E-E line in FIG. 4.
Figure 6:
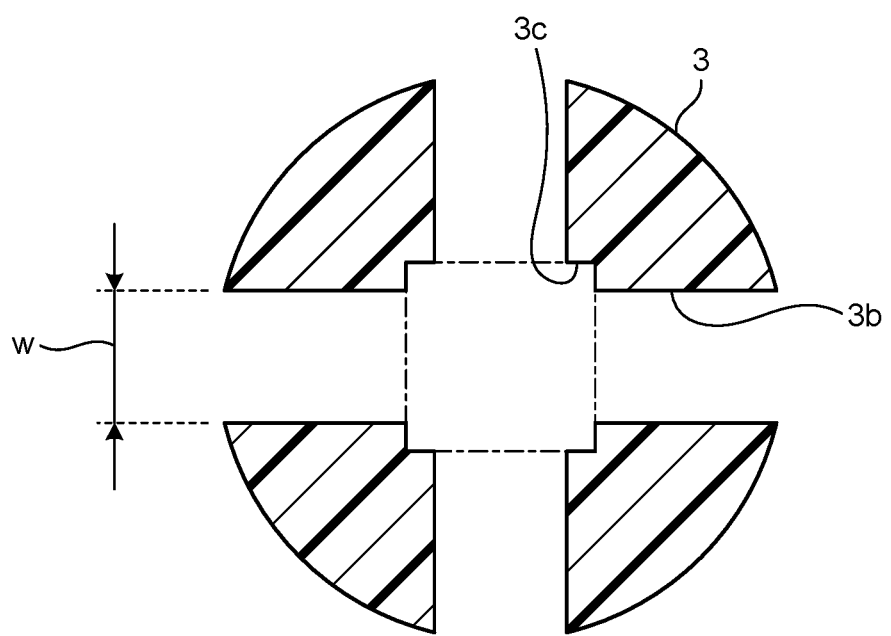
FIG. 6 is a sectional view corresponding to an F-F line in FIG. 4.

FIG. 4 is a schematic diagram illustrating a configuration of a crossing preventing member illustrated in FIG. 1. FIG. 5 is a sectional view corresponding to an E-E line in FIG. 4. FIG. 6 is a sectional view corresponding to an F-F line in FIG. 4. FIG. 4 to FIG. 6 are diagrams illustrating a state where the grasping force from the grasping member 4 has not been applied to the crossing preventing member 3.

The crossing preventing member 3 has a through hole 3a formed at the trailing end (see FIG. 5), slits 3b extending from the leading end to a midway point closer to the trailing end (see FIG. 4), and notched portions 3c formed in an area that is a projection of the through hole 3a toward the leading end (see FIG. 6).

The through hole 3a has, as illustrated in FIG. 2, the resin coated portions 2b of the four optical fiber core wires 2 inserted through the through hole 3a. The through hole 3a has a square shape with each side having a length approximately equal to a length corresponding to two of the resin coated portions 2b, and this length of one side is, for example, 250 μm.

The slits 3b each have a width having the width's center at a point that equally divides one of sides of a polygon by the number of the optical fiber core wires 2 that are in contact with that side, the polygon circumscribing the plural optical fiber core wires 2 in the cross section (a cross section orthogonal to the longitudinal direction) illustrated in FIG. 5, the cross section corresponding to the E-E line. In the case illustrated in FIG. 2 where the number of the optical fiber core wires 2 is four, the crossing preventing member 3 has four slits 3b each having a width w with the width w's center being at a midpoint of one of sides of a quadrangle circumscribing the optical fiber core wires 2. The width w of the slits 3b is, for example, 170 μm.

Each side of each of the notched portions 3c is, for example, 40 μm; and the slits 3b and the notched portions 3c form a quadrangle, as indicated by a dotted and dashed line, in a state where the grasping force from the grasping member 4 has not been applied to the crossing preventing member 3, the quadrangle having the same size as the through hole 3a and sides that are each 150 μm.

The widths of the slits 3b in the crossing preventing member 3 are narrowed toward the leading end by the grasping force applied to the crossing preventing member 3 by means of the grasping member 4, as illustrated in FIG. 1. This grasping force is a force applied toward the center of a cross section of the crossing preventing member 3, the cross section being orthogonal to the longitudinal direction.

Figure 7:
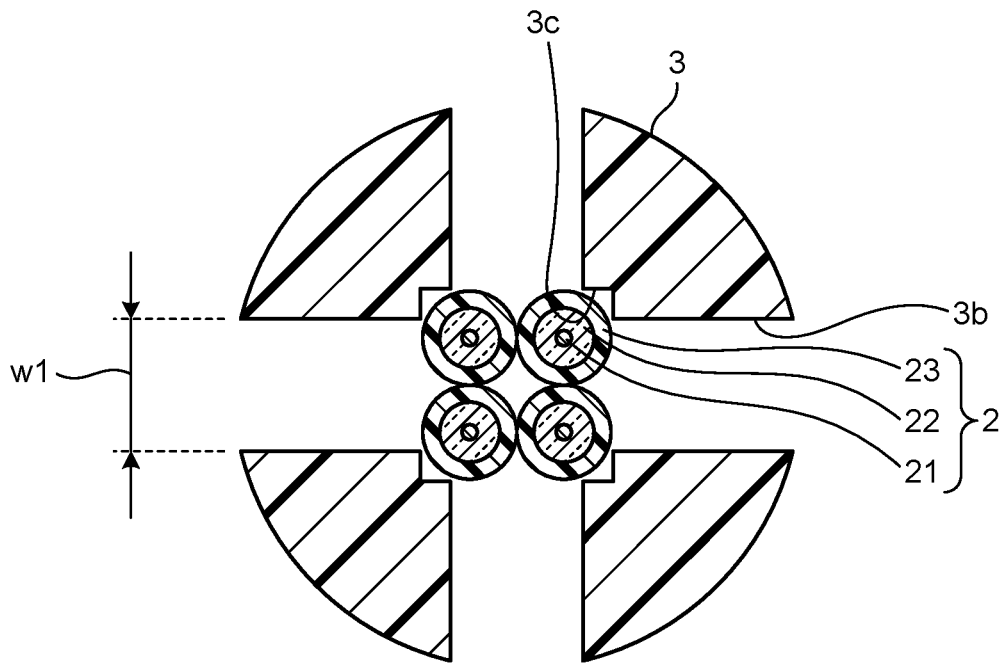
FIG. 7 is a sectional view corresponding to a B-B line in FIG. 1.

FIG. 7 is a sectional view corresponding to a B-B line in FIG. 1. In FIG. 7, a width w1 of the slits 3b has not been narrowed and is 170 μm, and a square formed by the slits 3b and the notched portions 3c is a quadrangle having sides that are each 250 μm and are each approximately equal to a length corresponding to two of the resin coated portions 2b.

Figure 8:
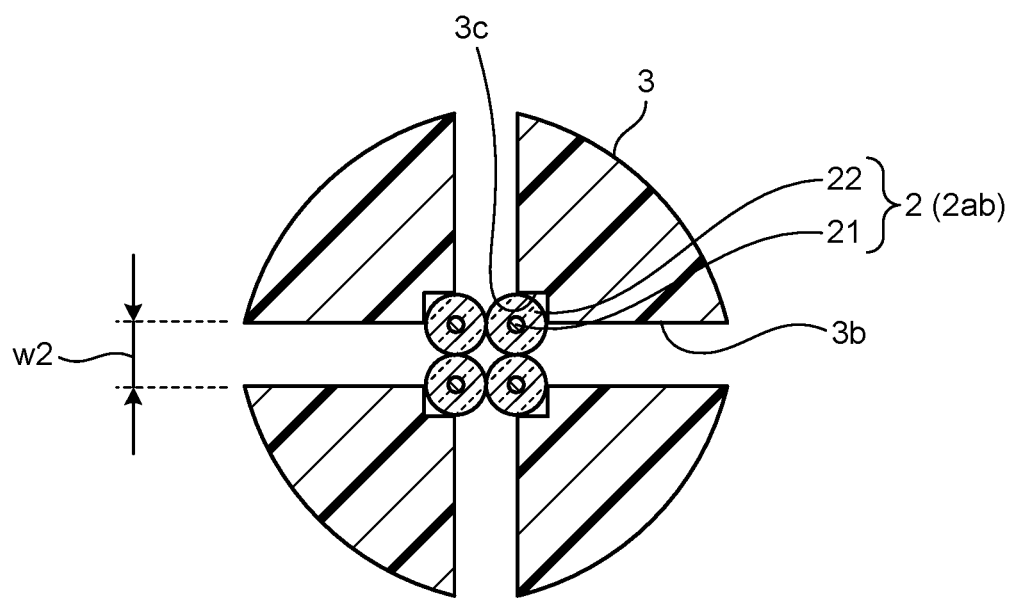
FIG. 8 is a sectional view corresponding to a C-C line in FIG. 1.

FIG. 8 is a sectional view corresponding to a C-C line in FIG. 1. In FIG. 8, a square formed by the slits 3b and the notched portions 3c is a quadrangle having sides that are each 160 μm and are each approximately equal to a length corresponding to twice the cladding diameter at the trailing end of the tapered portions 2ab. A width w2 of each of the slits 3b there is thus 80 μm.

Figure 9:
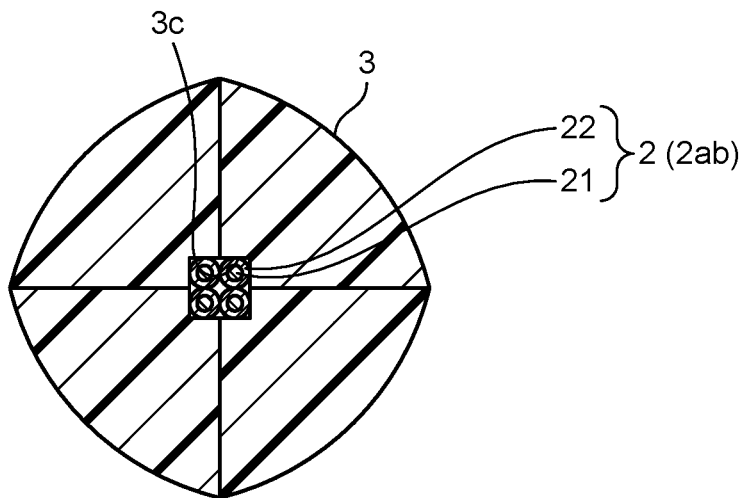
FIG. 9 is a sectional view corresponding to a D-D line in FIG. 1.

FIG. 9 is a sectional view corresponding to a D-D line in FIG. 1. In FIG. 9, the slits 3b each have a width of approximately zero. A quadrangle formed by the notched portions 3c then is a quadrangle having sides that are each 80 μm and are each approximately equal to twice the cladding diameter at the leading end of the tapered portions 2ab.

The grasping member 4 is a ring fitted around the crossing preventing member 3 closer to the leading end. However, as long as the grasping member 4 is configured to apply a grasping force to the crossing preventing member 3, the crossing preventing member 3 may be an elastic member that applies an elastic force to the crossing preventing member 3 from around the crossing preventing member 3, or a hole member into which the crossing preventing member 3 is fitted.

The width of the slit 3*b* positioned at each side is preferably equal to or larger than a difference between: a length of one side of a polygon circumscribing the plural optical fiber core wires 2 at a hindmost end portion of the slits 3*b* at the trailing end; and a length of one side of a polygon circumscribing the plural optical fiber core wires 2 at the leading end. Specifically, in the case illustrated in FIG. 2 where the number of the optical fiber core wires 2 is four, the difference between: 250 μm that is the length of one side of a quadrangle circumscribing the four optical fiber core wires 2 (the resin coated portions 2*b*) at the hindmost end portion of the slits 3*b* at the trailing end; and 80 μm that is the length of one side of a quadrangle circumscribing the four optical fiber core wires 2 (the small diameter portions 2*aa*) at the leading end, is 170 μm, and the slits 3*b* in the crossing preventing member 3 thus each have a width of 170 μm. As a result, the slits 3*b* decrease in width as the optical fiber core wires 2 are reduced in diameter from the trailing end toward the leading end, the crossing preventing member 3 comes into contact with the optical fiber core wires 2 over the entire optical fiber core wires 2 along the longitudinal direction, and the optical fiber core wires 2 are thereby prevented from crossing each other.

First Modified Example

Figure 10:
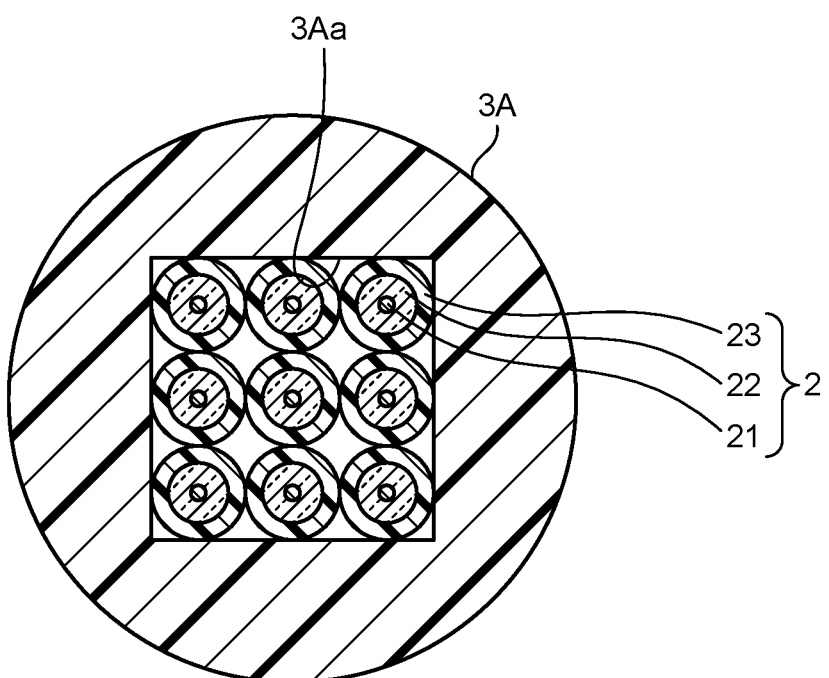
FIG. 10 is a sectional view illustrating optical fiber core wires and a crossing preventing member in a first modified example.

FIG. 10 is a sectional view illustrating optical fiber core wires and a crossing preventing member in a first modified example. FIG. 10 is a sectional view corresponding to the A-A line in FIG. 1. An optical fiber bundle structure in this first modified example includes nine optical fiber core wires 2 and a crossing preventing member 3A.

The optical fiber core wires 2 are arranged in a square arrangement in which the centers of their cores 21 form a square when joined to each other. The crossing preventing member 3A has a through hole 3Aa that is quadrangular. The optical fiber core wires 2 may be provided in a square arrangement having any number of the optical fiber core wires 2, for example, 2×2, 3×3, or 4×4, for example. In this case, the through hole formed in the crossing preventing member may be shaped into an approximate square.

Second Modified Example

Figure 11:
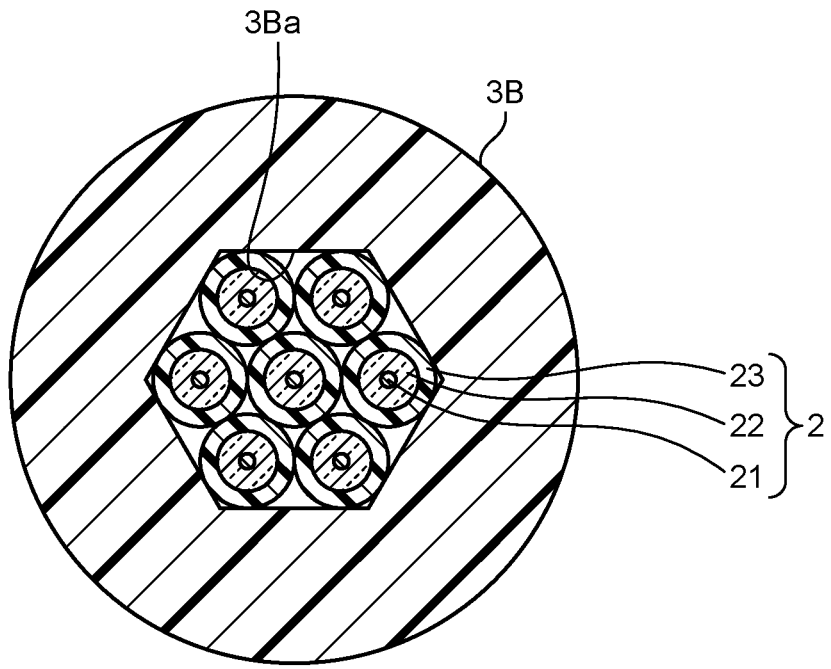
FIG. 11 is a sectional view illustrating optical fiber core wires and a crossing preventing member in a second modified example.

FIG. 11 is a sectional view illustrating optical fiber core wires and a crossing preventing member in a second modified example. FIG. 11 is a sectional view corresponding to the A-A line in FIG. 1. An optical fiber bundle structure in this second modified example includes seven optical fiber core wires 2 and a crossing preventing member 3B. The one in the center of the seven optical fiber core wires 2 may serve as a dummy and the number of optical fiber core wires 2 may thus be six.

The optical fiber core wires 2 are arranged in a hexagonal close-packed arrangement and a line joining the centers of the cores 21 of the outer optical fiber core wires 2 forms a hexagon. The crossing preventing member 3B has a through hole 3Ba that is hexagonal.

Figure 12:
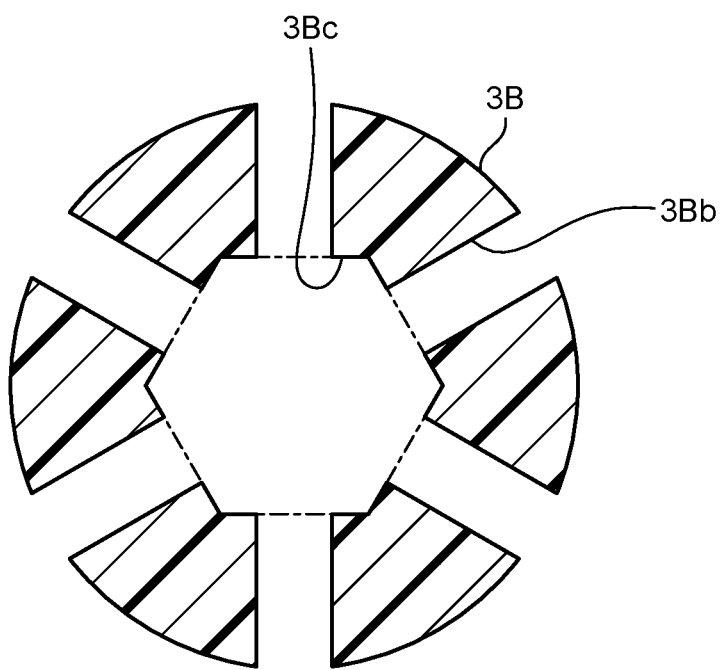
FIG. 12 is a diagram illustrating slits in the crossing preventing member according to the second modified example.

FIG. 12 is a diagram illustrating slits in the crossing preventing member according to the second modified example. FIG. 12 is a sectional view corresponding to the E-E line in FIG. 5. The crossing preventing member 3B has six slits 3Bb each having its center at a midpoint of one of sides of a hexagon circumscribing the optical fiber core wires 2. In a state where a grasping force has not been applied to the crossing preventing member 3B, the slits 3Bb and notched portions 3Bc form a hexagon having the same size as the through hole 3Ba, as indicated by a dotted and dashed line.

Third Modified Example

Figure 13:
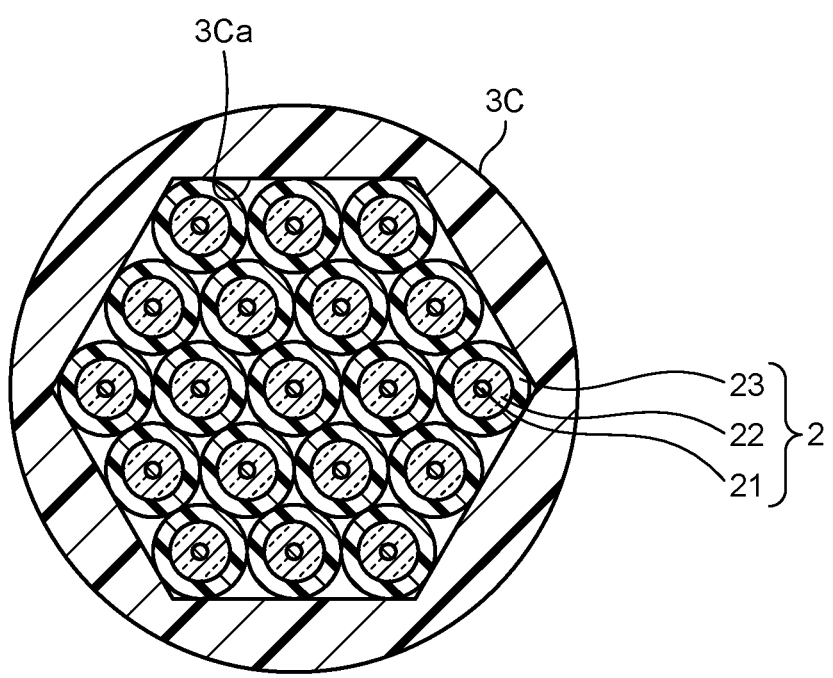
FIG. 13 is a sectional view illustrating optical fiber core wires and a crossing preventing member in a third modified example.

FIG. 13 is a sectional view illustrating optical fiber core wires and a crossing preventing member in a third modified example. FIG. 13 is a sectional view corresponding to the A-A line in FIG. 1. An optical fiber bundle structure in this third modified example includes 19 optical fiber core wires 2 and a crossing preventing member 3C.

The optical fiber core wires 2 are provided in a hexagonal close-packed arrangement in which the centers of their cores 21 form a hexagon when joined to each other. The crossing preventing member 3C has a through hole 3Ca that is hexagonal. The optical fiber core wires 2 may be provided in a hexagonal close-packed arrangement having any number of the optical fiber core wires 2, for example, 1+6, 1+6+2×6, or 1+6+2×6+3×6, for example. In this case, the through hole formed in the crossing preventing member may be shaped into an approximate hexagon.

Fourth Modified Example

Figure 14:
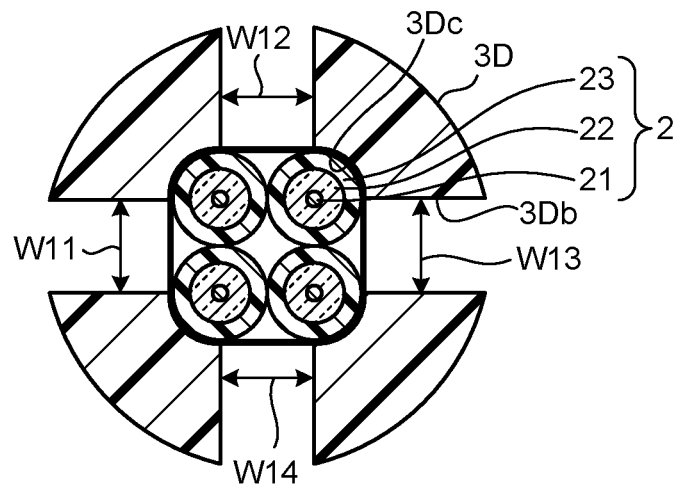
FIG. 14 is a sectional view of optical fiber core wires and a crossing preventing member in a fourth modified example, the sectional view corresponding to the B-B line in FIG. 1.

FIG. 14 is a sectional view of optical fiber core wires and a crossing preventing member in a fourth modified example, the sectional view corresponding to the B-B line in FIG. 1. As illustrated in FIG. 14, slits 3Db each have a width having the width's center at a point that equally divides one of sides of an approximate polygon approximately circumscribing plural optical fiber core wires 2, by the number of optical fiber core wires 2 that are in contact with that side. In the case illustrated in FIG. 14 where the number of the optical fiber core wires 2 is four, a crossing preventing member 3D has four slits 3Db having widths W11, W12, W13, and W14 each having its center at a midpoint of one of sides of an approximate quadrangle circumscribing the optical fiber core wires 2. The sum of the widths of the slits 3Db (W11+W12+W13+W14) is, for example, 680 μm.

Notched portions 3Dc each have, for example, a curved shape formed of a part of a circle having a radius of 40 μm, the curved shape approximately circumscribing the optical fiber core wire 2. In the example illustrated in FIG. 14, the notched portions 3Dc are, for example, circular arc shaped. In a state where a grasping force from the grasping member 4 has not been applied to the crossing preventing member 3D, the slits 3Db and the notched portions 3Dc form, as indicated by a thick bold line, an approximate quadrangle having sides that are each about 250 μm, the approximate quadrangle having the same size as a through hole (not illustrated in the drawings) in the crossing preventing member 3D, the approximate quadrangle having corners each having a smooth circular arc shape. That is, in FIG. 14, the sum of the widths of the slits 3Db (W11+W12+W13+W14) has not been reduced and is thus, for example, 680 μm, and an approximate square that is the approximate polygon formed by the slits 3Db and the notched portions 3Dc thus has a shape in which four corners of a quadrangle have each been made into a curved shape, the quadrangle having sides that are each 250 μm and that are each approximately equal to a length corresponding to two of the resin coated portions 2*b*.

Figure 15:
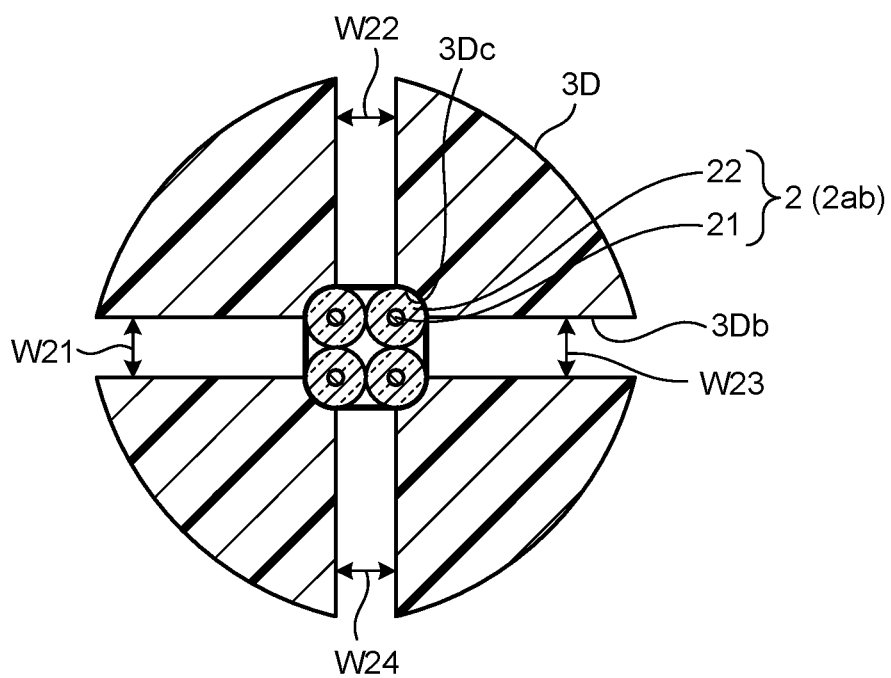
FIG. 15 is a sectional view of the optical fiber core wires and the crossing preventing member in the fourth modified example, the sectional view corresponding to the C-C line in FIG. 1.

As illustrated in FIG. 1, the widths of the slits 3*b* in the crossing preventing member 3 are narrowed toward the leading end by the grasping force applied to the crossing preventing member 3 by the grasping member 4. FIG. 15 is a sectional view of the optical fiber core wires and the crossing preventing member in the fourth modified example, the sectional view corresponding to the C-C line in FIG. 1. In FIG. 15, an approximate square formed by the slits 3Db and the notched portions 3Dc is a quadrangle having sides that are each 160 μm and that are each approximately equal to twice the cladding diameter at the trailing end of the tapered portion 2ab. That is, the sum of widths of the slits 3Db in FIG. 15 (W21+W22+W23+W24) is 320 μm.

As illustrated in FIG. 14 and FIG. 15, each of the notched portions 3Dc that are at vertices of an approximate polygon circumscribing plural optical fiber core wires 2, for example, the four optical fiber core wires 2, has a curved shape circumscribing the optical fiber core wire 2. The sum of the widths of the slits 3Db positioned respectively at the sides (W11+W12+W13+W14) is equal to or larger than a difference between: a length of the shortest perimeter (a thick solid line in FIG. 14) surrounding the plural optical fiber core wires 2 at a hindmost end portion of the slits at the trailing end; and a length of the shortest perimeter surrounding the plural optical fiber core wires 2 at the leading end (a thick solid line in FIG. 15).

Second Embodiment

Optical Connector

Figure 16:
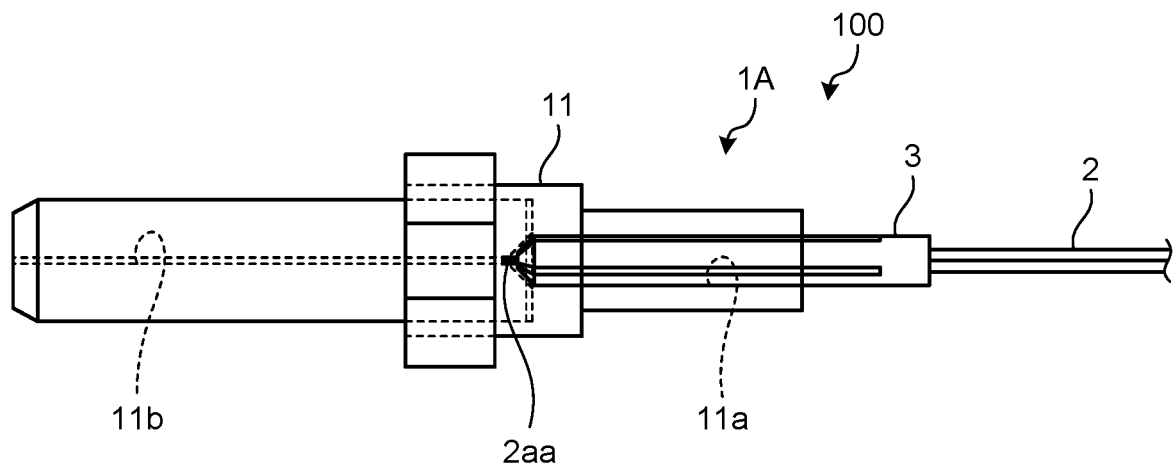
FIG. 16 is a schematic diagram illustrating a configuration of an optical connector according to a second embodiment.

An optical connector using the optical fiber bundle structure 1 will be described next. FIG. 16 is a schematic diagram illustrating a configuration of an optical connector according to a second embodiment. An optical connector 100 includes an optical fiber bundle structure 1A.

The optical fiber bundle structure 1A includes a ferrule 11 having a hole portion 11a formed therein. This hole portion 11a applies a grasping force to the crossing preventing member 3 placed therein. Furthermore, the ferrule 11 has a thin hole portion 11b into which the small diameter portions 2aa of the optical fiber core wires 2 are placed.

The second embodiment described above enables connection to a multi-core fiber with a small loss, for example, the multi-core fiber being built in a connector to which the optical connector 100 is connectable.

Figure 17:
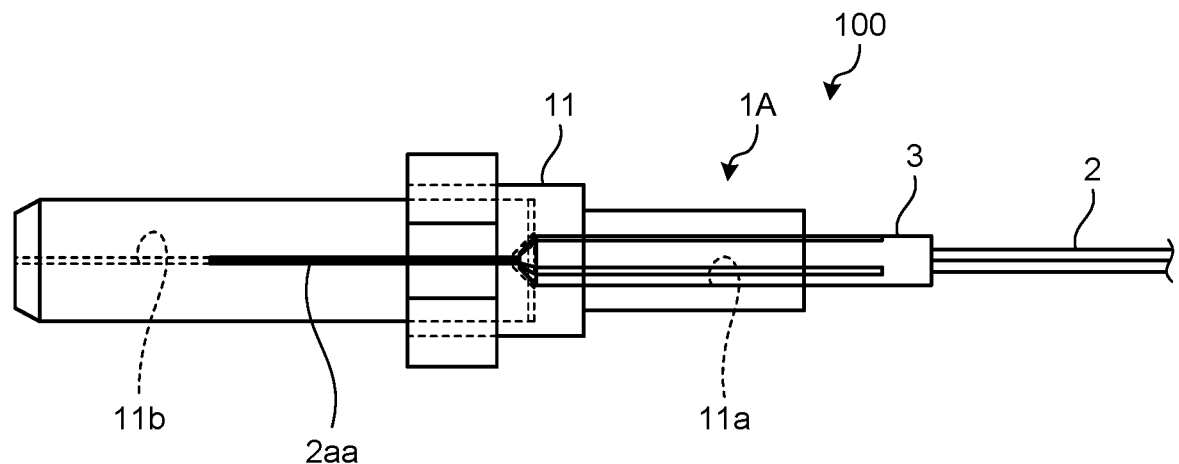
FIG. 17 is a diagram illustrating how optical fiber core wires in FIG. 16 are pushed in toward a leading end.

FIG. 17 is a diagram illustrating how optical fiber core wires in FIG. 16 are pushed in toward a leading end. As illustrated in FIG. 17, after the optical fiber bundle structure 1A has been placed in the hole portion 11a of the ferrule 11, the optical fiber core wires 2 may be pushed in so that a leading end of the small diameter portions 2aa reaches a deep portion of the thin hole portion 11b.

Third Embodiment

Optical Fiber Connection Structure

Figure 18:
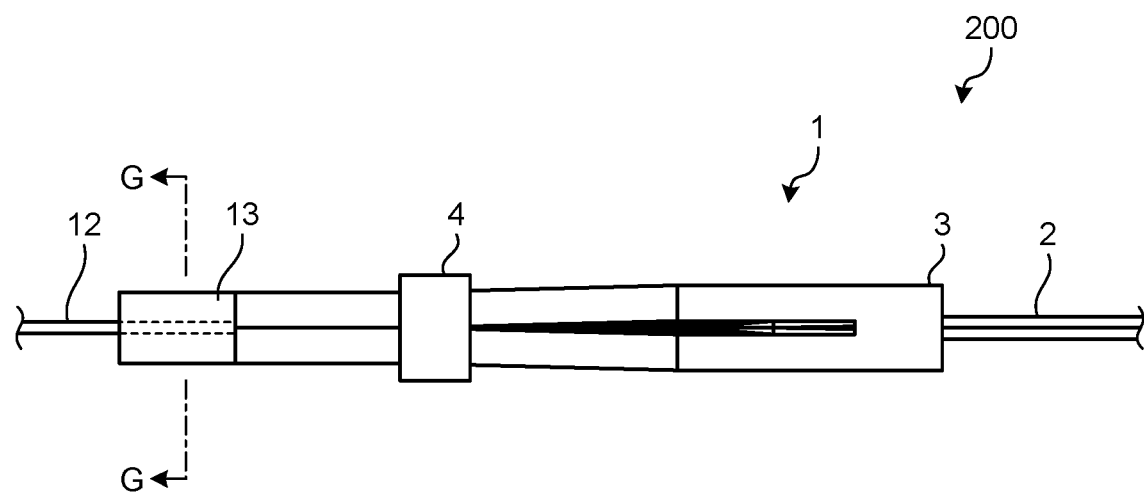
FIG. 18 is a schematic diagram illustrating a configuration of an optical fiber connection structure according to a third embodiment.
Figure 19:
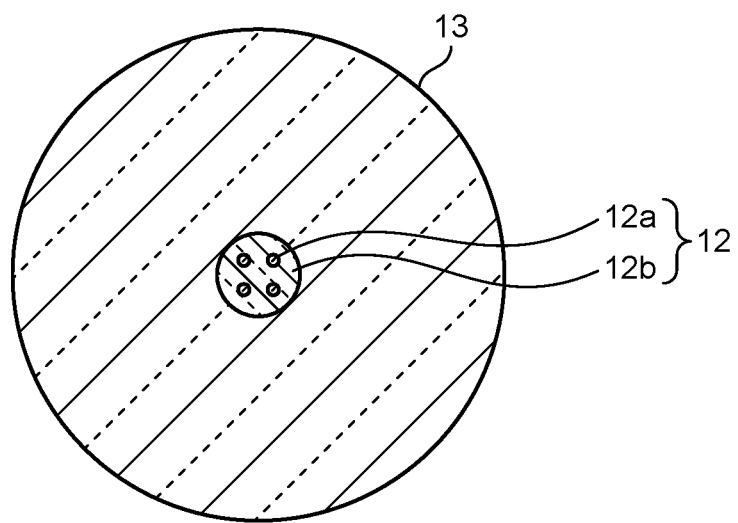
FIG. 19 is a sectional view corresponding to a G-G line in FIG. 18.

FIG. 18 is a schematic diagram illustrating a configuration of an optical fiber connection structure according to a third embodiment. FIG. 19 is a sectional view corresponding to a G-G line in FIG. 18. An optical fiber connection structure 200 includes the optical fiber bundle structure 1, a multi-core fiber 12, and a capillary 13.

The multi-core fiber 12 has plural cores 12a that are plural core portions, and a cladding 12b that is a cladding portion formed around the cores 12a. The multi-core fiber 12 has, as illustrated in FIG. 19, for example, four cores 12a and the cores 12a are provided in a square arrangement. These cores 12a are respectively connected to the cores 21.

The optical fiber bundle structure 1 and the multi-core fiber 12 are connected to each other by bonding or fusion. This third embodiment described above enables connection between the cores 12a of the multi-core fiber 12 and the respective cores 21 of the optical fiber core wires 2, with a small loss.

Fourth Embodiment

Another Optical Fiber Connection Structure

Figure 20:
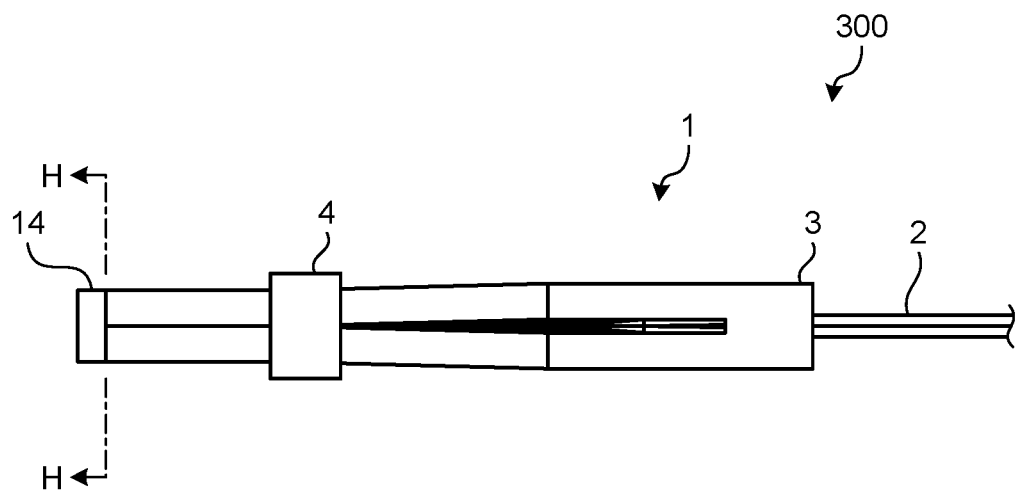
FIG. 20 is a schematic diagram illustrating a configuration of an optical fiber connection structure according to a fourth embodiment.
Figure 21:
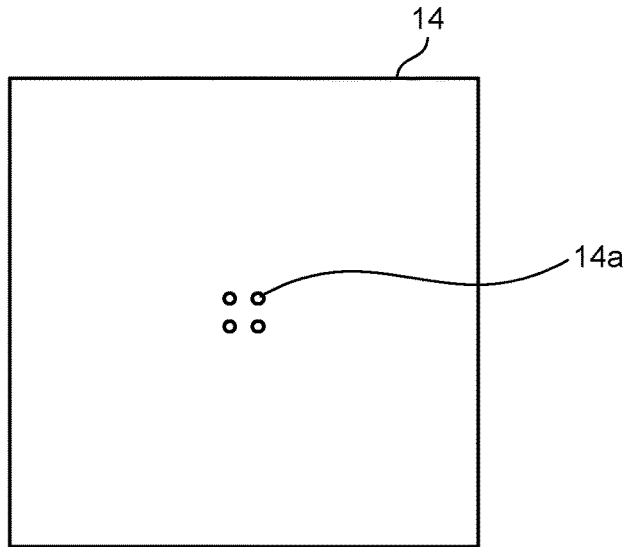
FIG. 21 is a sectional view corresponding to an H-H line in FIG. 20.

FIG. 20 is a schematic diagram illustrating a configuration of an optical fiber connection structure according to a fourth embodiment. FIG. 21 is a sectional view corresponding to an H-H line in FIG. 20. An optical fiber connection structure 300 includes the optical fiber bundle structure 1 and a light receiving and emitting element 14.

The light receiving and emitting element 14 has, as illustrated in FIG. 21, plural light receiving and emitting portions, for example, four light receiving and emitting portions 14a that are provided in a square arrangement. The light receiving and emitting portions 14a are respectively connected to the cores 21.

Joining the optical fiber bundle structure 1 and the light receiving and emitting element 14 to each other enables connection between the light receiving and emitting portions 14a of the light receiving and emitting element 14 and the cores 21 of the optical fiber core wires 2 with a small loss.

Method of Manufacturing Optical Fiber Bundle Structure

Figure 22:
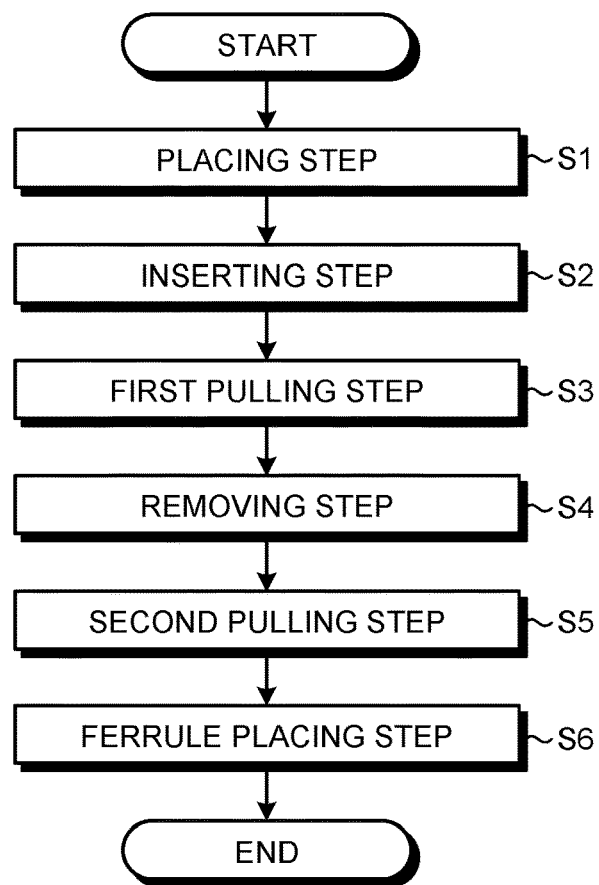
FIG. 22 is a flowchart illustrating a method of manufacturing an optical fiber bundle structure.

A method of manufacturing the optical fiber bundle structure 1 will be described next. FIG. 22 is a flowchart illustrating a method of manufacturing an optical fiber bundle structure.

Figure 23:
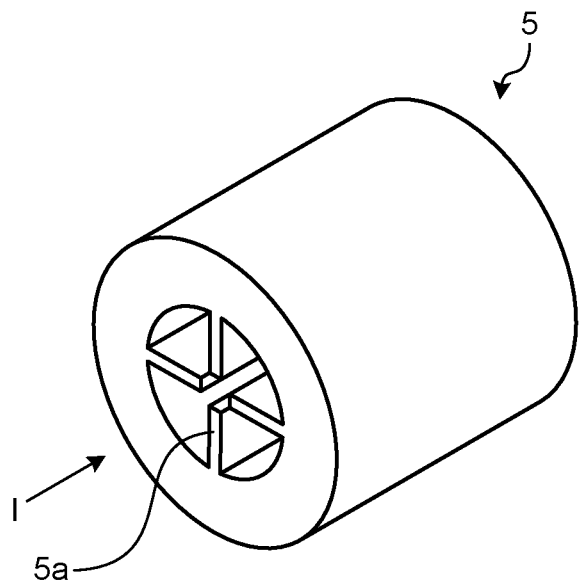
FIG. 23 is a schematic diagram illustrating a configuration of a guide member.
Figure 24:
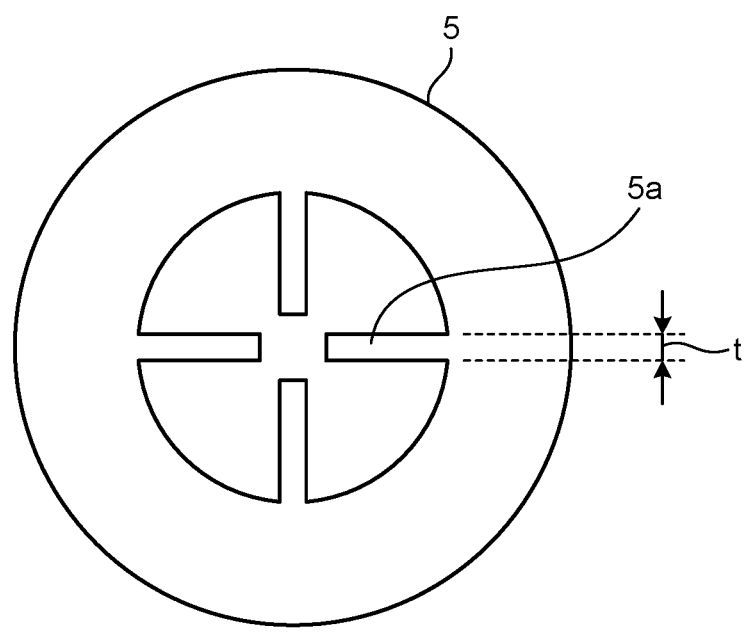
FIG. 24 is a view taken in the direction of an arrow I in FIG. 23.

Firstly, the crossing preventing member 3 is placed into a guide member (Step S1: a placing step). FIG. 23 is a schematic diagram illustrating a configuration of the guide member. FIG. 24 is a view taken in the direction of an arrow I in FIG. 23. A guide member 5 is an annular member and has protruding portions 5a each protruding radially inward and having a thickness t. The thickness t of the protruding portions 5a is, for example, 80 μm.

Figure 25:
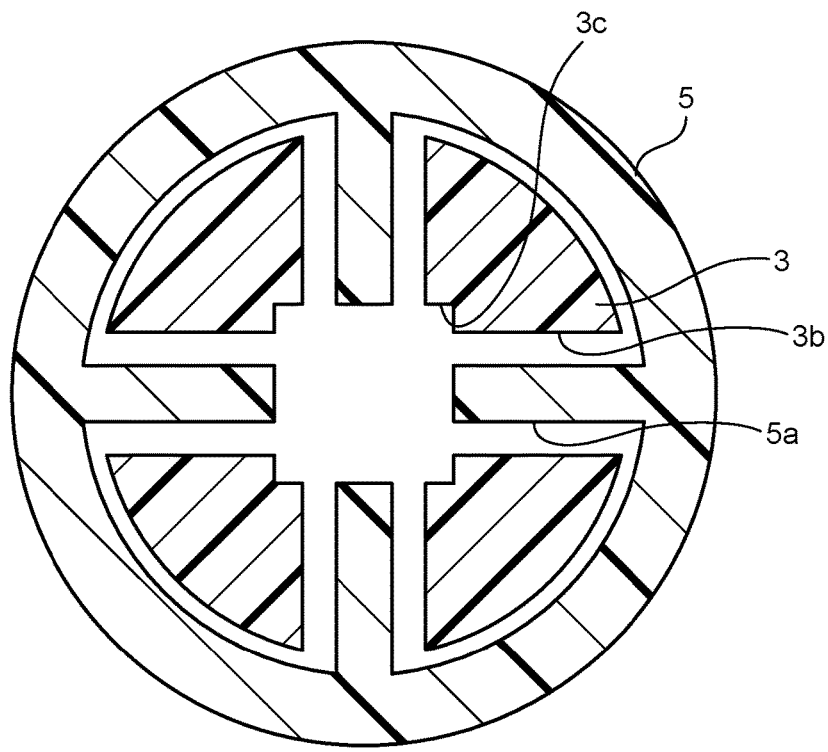
FIG. 25 is a diagram illustrating how a crossing preventing member has been placed into the guide member.

FIG. 25 is a diagram illustrating how a crossing preventing member has been placed into the guide member. The crossing preventing member 3 is placed into the guide member 5 so that the protruding portions 5a of the guide member 5 are fitted in the slits 3b of the crossing preventing member 3.

Figure 26:
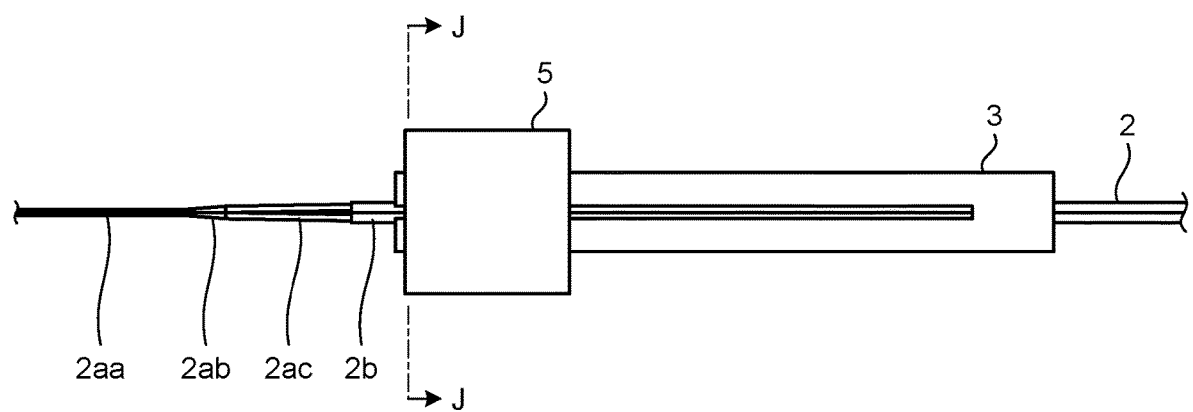
FIG. 26 is a diagram illustrating how optical fiber core wires are inserted into the crossing preventing member.
Figure 27:
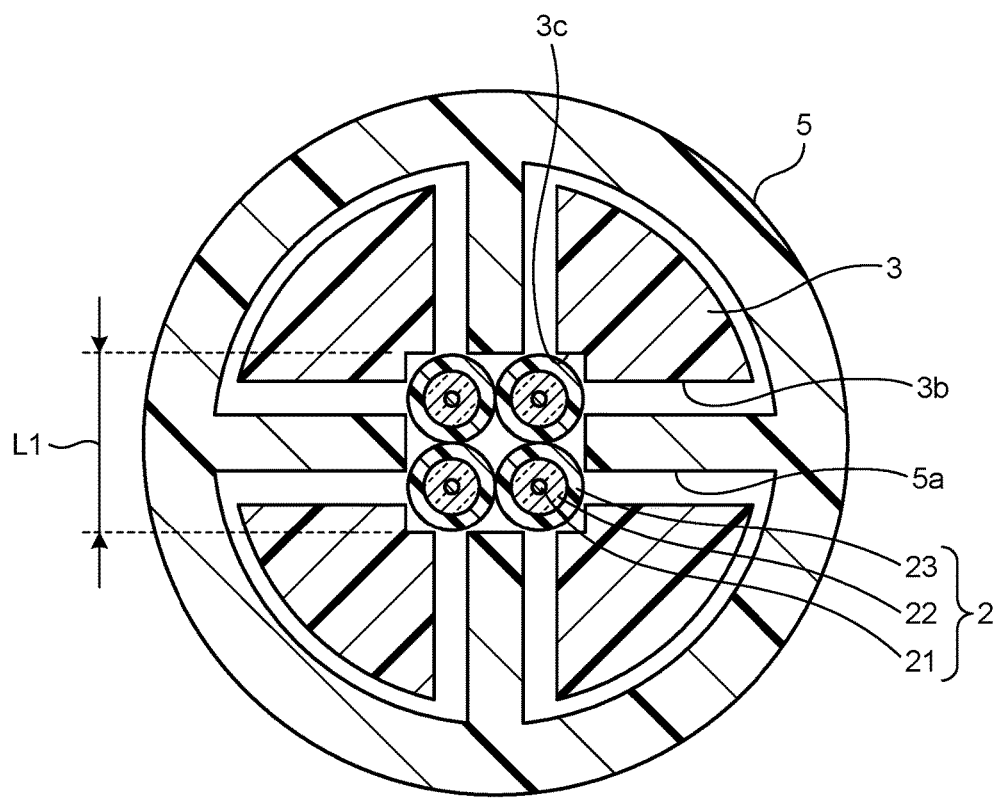
FIG. 27 is a sectional view corresponding to a J-J line in FIG. 26.

Subsequently, the plural optical fiber core wires 2 are inserted in the crossing preventing member 3 (Step S2: an inserting step). FIG. 26 is a diagram illustrating how optical fiber core wires are inserted into the crossing preventing member. FIG. 27 is a sectional view corresponding to a J-J line in FIG. 26. The four optical fiber core wires 2 are lined up to be in a square arrangement and are inserted from the leading end of the crossing preventing member 3 toward the trailing end. In the cross section illustrated in FIG. 27, a length L1 of one side of the square formed by the slits 3b and the notched portions 3c is 250 μm and is approximately equal to a length corresponding to two of the resin coated portions 2b.

While a grasping force F is being applied to the crossing preventing member 3, the optical fiber core wires 2 are pulled toward the trailing end until the trailing end of the tapered portions 2ab of the glass fiber portions 2a is positioned inside the crossing preventing member 3 (Step S3: a first pulling step). The grasping force F on the crossing preventing member 3 may be applied by the guide member 5 or the grasping force F may be applied to the crossing preventing member 3 by hand.

Figure 28:
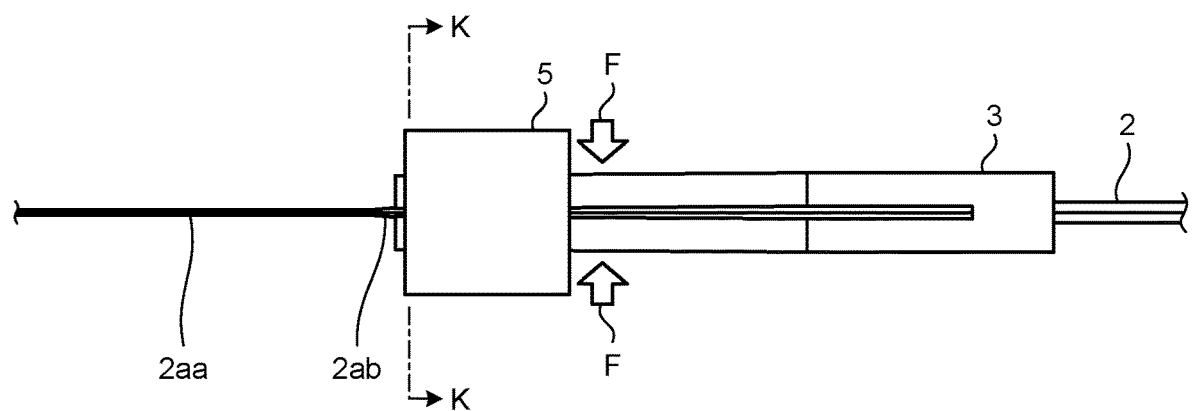
FIG. 28 is a diagram illustrating how a trailing end of tapered portions of the optical fiber core wires is positioned inside the guide member.
Figure 29:
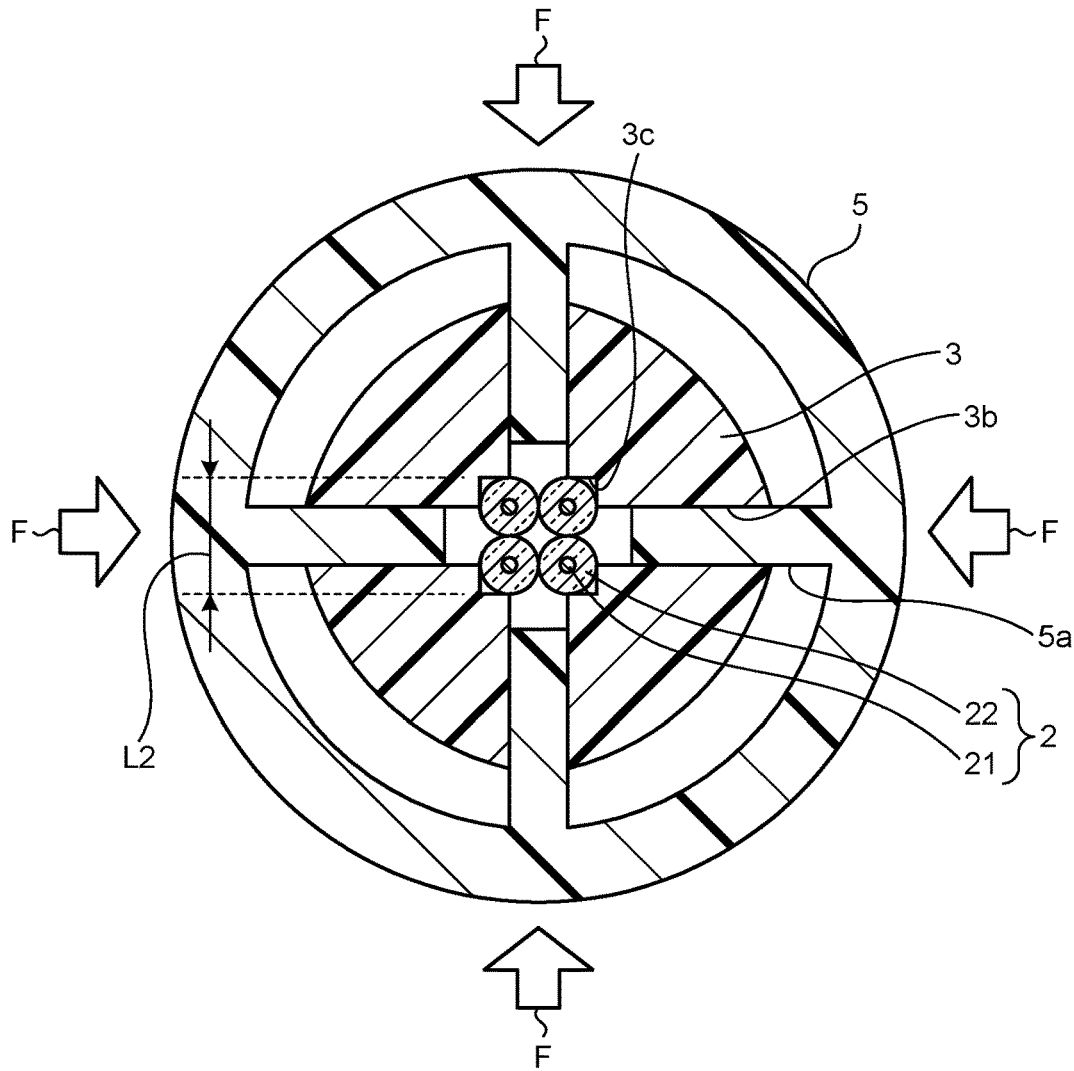
FIG. 29 is a sectional view corresponding to a K-K line in FIG. 28.

FIG. 28 is a diagram illustrating how a rear end of tapered portions of the optical fiber core wires is positioned inside the guide member. FIG. 29 is a sectional view corresponding to a K-K line in FIG. 28. In the state illustrated in FIG. 28 and FIG. 29, the inner surface of the crossing preventing member 3 is in contact with the optical fiber core wires 2 due to the grasping force F. In the cross section illustrated in FIG. 29, a length L2 of one side of the square formed by the slits 3b and the notched portions 3c is 160 µm and is approximately equal to a length corresponding to two of the large diameter portions 2ac. In this state, the gaps of the slits 3b match the thicknesses of the protruding portions 5a.

Thereafter, the guide member 5 is removed from the crossing preventing member 3 (Step S4: a removing step).

Figure 30:
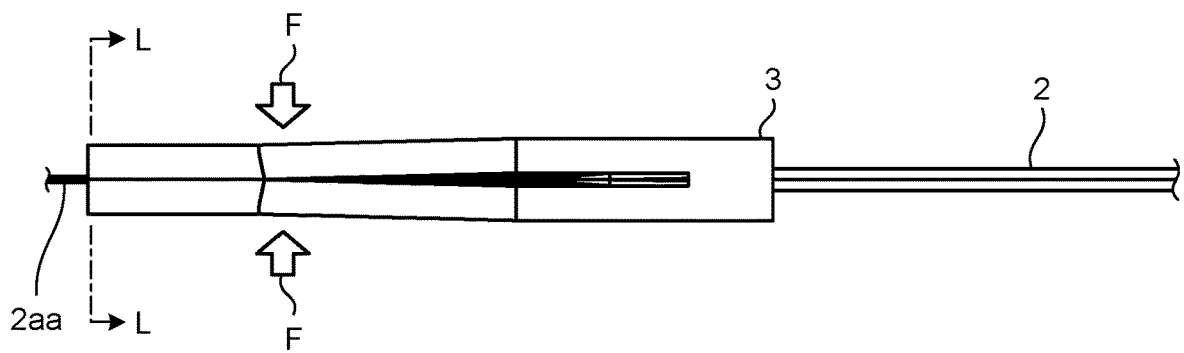
FIG. 30 is a diagram illustrating how the optical fiber core wires have been inserted into the crossing preventing member, up to small diameter portions thereof.
Figure 31:
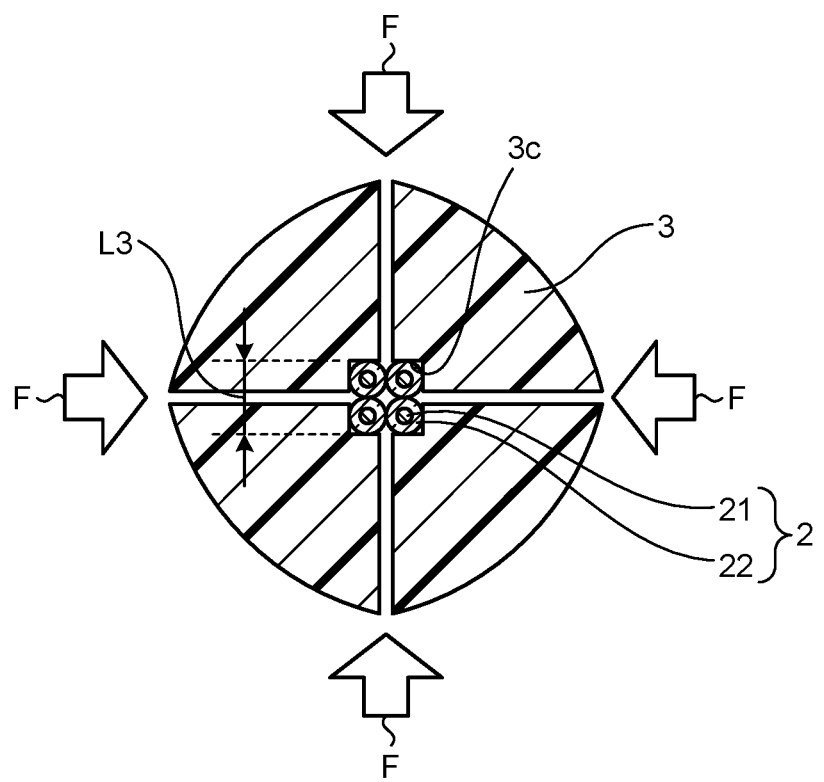
FIG. 31 is a sectional view corresponding to an L-L line in FIG. 30.

While the grasping force F is being applied to the crossing preventing member 3, the optical fiber core wires 2 are pulled toward the trailing end until the small diameter portions 2aa of the glass fiber portions 2a are positioned inside the crossing preventing member 3 (Step S5: a second pulling step). FIG. 30 is a diagram illustrating how the optical fiber core wires have been inserted into the crossing preventing member, up to small diameter portions thereof. FIG. 31 is a sectional view corresponding to an L-L line in FIG. 30. In the state illustrated in FIG. 30 and FIG. 31, the inner surface of the crossing preventing member 3 is in contact with the optical fiber core wires 2 due to the grasping force F. In the cross section illustrated in FIG. 31, a length L3 of one side of a square formed by the slits 3b and the notched portions 3c is 80 µm and is approximately equal to a length corresponding to two of the small diameter portions 2aa.

The thickness t of the protruding portions 5a of the guide member 5 is preferably equal to or larger than a difference between: a length (160 µm) of one side of a polygon (a quadrangle) circumscribing the plural optical fiber core wires 2 at the trailing end of the tapered portions 2ab of the optical fiber core wires 2; and a length (80 µm) of one side of a polygon (a quadrangle) circumscribing the plural optical fiber core wires 2 at the leading end of the tapered portions 2ab of the optical fiber core wires 2. If this condition is satisfied, when the guide member 5 is removed from the crossing preventing member 3, gaps each corresponding to the thickness t of the protruding portions 5a are generated at the slits 3b. As a result, the slits 3b are reduced in width as the optical fiber core wires 2 are reduced in diameter from the trailing end of the tapered portions 2ab to the leading end of the tapered portions 2ab, the crossing preventing member 3 comes into contact with the optical fiber core wires 2 over the entire tapered portions 2ab of the optical fiber core wires 2 along the longitudinal direction, and the optical fiber core wires 2 are thus prevented from crossing each other.

The crossing preventing member 3 is placed into a hole portion of a ferrule while the grasping force F is being applied to the crossing preventing member 3 (Step SS6: a ferrule inserting step). Specifically, for example, the crossing preventing member 3 is placed into the hole portion 11a of the ferrule 11 illustrated in FIG. 16.

The present disclosure can be preferably applied to an optical fiber bundle structure in which cores of a single core fibers are arranged to the positions where the cores of a multicore fiber are provided.

According to an embodiment, it is possible to obtain an effect of providing an optical fiber bundle structure, an optical connector, an optical fiber connection structure, and a method of manufacturing the optical fiber bundle structure, with a small loss.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A method of manufacturing an optical fiber bundle structure, the method including:
   a placing step of placing a crossing preventing member into a guide member that is annular so that protruding portions protruding radially inward in the guide member are fitted into slits formed in the crossing preventing member, the slits each having, in a cross section orthogonal to a longitudinal direction of the crossing preventing member, a width with a width's center at a point equally dividing one of sides of a polygon circumscribing plural optical fiber core wires, by a number of the optical fiber core wires that are in contact with that side, the crossing preventing member having the plural optical fiber core wires inserted through the crossing preventing member along the longitudinal direction, the plural optical fiber core wires having, in order from a leading end of the plural optical fiber core wires, a glass fiber portion and a resin coated portion having resin that covers glass fibers, the slits extending from a leading end of the crossing preventing member to a midway point closer to a trailing end of the crossing preventing member, the widths of the slits positioned at the respective sides each being equal to or larger than a difference between: a length of one side of a polygon circumscribing the plural optical fiber core wires at a hindmost end portion of the slits at the trailing end; and a length of one side of a polygon circumscribing the plural optical fiber core wires at the leading end;
   an inserting step of inserting the plural optical fiber core wires that have been lined up in a predetermined arrangement, into the crossing preventing member from the leading end to trailing end of the crossing preventing member;
   a pulling step of pulling the optical fiber core wires toward the trailing end while applying a grasping force to the crossing preventing member, until a small diameter portion of the glass fiber portion is positioned inside the crossing preventing member, the glass fiber portion having, in order from a leading end of the glass fiber portion: the small diameter portion; a tapered portion; and a large diameter portion;
   a removing step of removing the guide member from the crossing preventing member; and
   a ferrule placing step of placing the crossing preventing member into a hole portion of a ferrule while applying a grasping force to the crossing preventing member.

2. The method of manufacturing the optical fiber bundle structure, according to claim 1, wherein
   the pulling step includes:
      a first pulling step of pulling the optical fiber core wires toward the trailing end until a trailing end of the tapered portion of the glass fiber portion is positioned inside the crossing preventing member; and
      a second pulling step of pulling the optical fiber core wires toward the trailing end until the small diameter portion of the glass fiber portion is positioned inside the crossing preventing member, and
   the removing step is executed between the first pulling step and the second pulling step.

* * * * *